(12) United States Patent
Bird

(10) Patent No.: US 9,494,040 B2
(45) Date of Patent: Nov. 15, 2016

(54) TURBINE ENGINE BLADE REMOVAL APPARATUS AND METHOD

(71) Applicant: Siemens Energy, Inc., Orlando, FL (US)

(72) Inventor: Derek A. Bird, Oviedo, FL (US)

(73) Assignee: Siemens Energy, Inc., Orlando, FL (US)

(*) Notice: Subject to any disclaimer, the term of this patent is extended or adjusted under 35 U.S.C. 154(b) by 259 days.

(21) Appl. No.: 14/173,843

(22) Filed: Feb. 6, 2014

(65) Prior Publication Data

US 2015/0218948 A1 Aug. 6, 2015

(51) Int. Cl.
| | |
|---|---|
| *F01D 5/00* | (2006.01) |
| *F01D 5/30* | (2006.01) |
| *F01D 25/28* | (2006.01) |
| *B23P 19/02* | (2006.01) |

(52) U.S. Cl.
CPC ............. *F01D 5/005* (2013.01); *F01D 5/3007* (2013.01); *F01D 25/285* (2013.01); *B23P 19/025* (2013.01); *Y10T 29/49318* (2015.01); *Y10T 29/5393* (2015.01)

(58) Field of Classification Search
CPC ..................... B23P 6/002; B23P 19/025; B23P 19/04; B23P 2700/13; F05D 2230/70; F01D 5/005; F01D 25/285; Y10T 29/49318; Y10T 29/49815; Y10T 29/49822

See application file for complete search history.

(56) References Cited

U.S. PATENT DOCUMENTS

| | | |
|---|---|---|
| 3,673,668 A | 7/1972 | Crook |
| 4,096,614 A | 6/1978 | Brungard et al. |
| 4,455,730 A | 6/1984 | Guenther |
| 6,416,286 B1 | 7/2002 | Roberts et al. |
| 6,571,471 B2 | 6/2003 | Hohmann |
| 7,455,505 B2 | 11/2008 | Hartmann et al. |
| 7,934,302 B2 | 5/2011 | Kalmar et al. |
| 8,381,379 B2 | 2/2013 | Holmes et al. |
| 2011/0179645 A1 | 7/2011 | Silieti et al. |

*Primary Examiner* — Christopher Besler

(57) ABSTRACT

A turbine engine blade removal apparatus with a pair of opposed outwardly biased blocks are positioned proximal a blade root and corresponding rotor disc slot between opposed axial faces of the subject first rotor disc and an adjoining second rotor disc. The blocks are outwardly biased in abutting contact with first and second rotor disc axial faces, aligning an aperture of a guide bushing with an exposed axial face of the blade root, the guide bushing coupled to at least the first block. A punch is inserted in the guide bushing aperture so that a punch tip is in abutting relationship with the blade root axial face. An impact tool drives an opposite impact end of the punch, causing the punch to direct a relative driving force on the blade root, separating the blade root from the corresponding rotor disc slot.

6 Claims, 4 Drawing Sheets

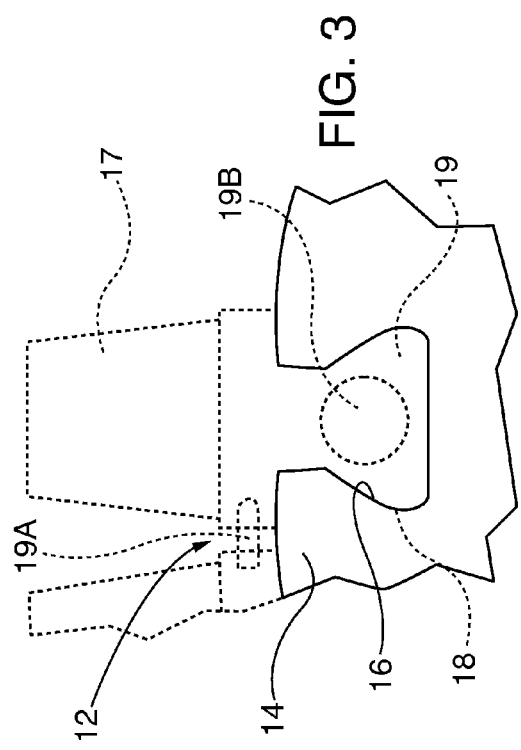
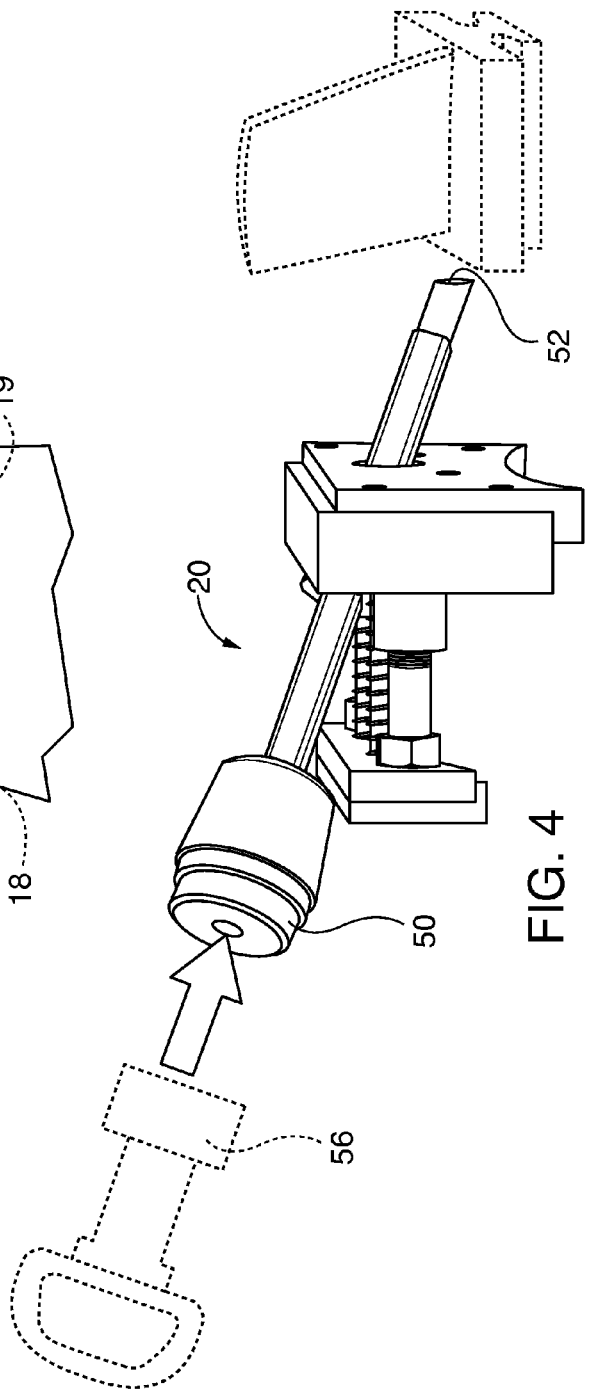

TURBINE ENGINE BLADE REMOVAL APPARATUS AND METHOD

BACKGROUND OF THE INVENTION

1. Field of the Invention

The invention relates to turbine engine blade removal apparatus and methods for removing turbine or compressor section blades from turbine engine rotors. More particularly, the invention relates to turbine engine blade removal apparatus and methods that drive a stuck turbine or compressor blade root out of its corresponding rotor disc slot, minimizing risk of inadvertent damage to the blade root, the rotor disc slot or rotor discs. Exemplary embodiments of the methods and apparatus of the invention are utilized for non-destructive removal of gas turbine engine compressor section rotor blades that are stuck in their rotor slots, with the understanding that they are also useful for removal of turbine section blades.

2. Description of the Prior Art

Turbine or compressor blades (hereafter referred to generally as "turbine blades" or "blades") are generally coupled to gas or steam turbine engines by elongated tapered male blade roots that are engaged in corresponding mating rotor disc female slots. The blade roots are inserted radially between rotor discs, aligned concentrically with the mating rotor slot and inserted in a generally axial direction that is generally parallel to the rotor shaft centerline. The blade root/rotor slot inserted axial positions are locked in place with blade lock pins that are inserted sequentially between each successive blade during rotor assembly. During turbine engine operation the mating turbine blade roots and rotor slots sliding interfaces as well as the blade lock pins become contaminated with rust and debris, effectively corroding them together as a unitized structure. The stuck blade needs to be removed by application of external force to separate the blade root from its rotor disc slot.

During turbine service repair, the turbine blades were separated from the rotor for repair and replacement. In the past, a corroded blade/slot/pin interface was separated manually by use of heavy sledge hammers or pneumatic hammers hammering an angularly offset drift punch abutted against the blade root within the peripheral boundaries established by the rotor slot. It was difficult to align and hold a drift punch in offset alignment with the blade root while hammering the drift punch. Manual alignment of the drift punch also risked inadvertent punch or hammer slippage that might inadvertently strike and damage any of the targeted or surrounding rotor discs, the targeted rotor disc slot and/or the blade root. Other manual turbine blade extraction methods have included destruction of the blade/blade root/pin interface by known grinding or milling metal working processes, but such methods destroyed the blade and risked damage to the rotor disc slot.

Powered blade removal tools have been utilized to push stuck blades out of their mating rotor slot. In U.S. Patent Publication No. 2001/0179645 a housing is inserted radially over a turbine, circumscribing the blade and both the corresponding proximal outer circumferential and axial faces of the rotor disc. The tool supports a pivoting cam mechanism and a cam-pivoting impact wrench between the subject turbine disc row and an adjoining opposed row. The impact wrench pivots the cam tip into contact with an abutting axial face of the blade root, driving the stuck root out of the rotor slot. In U.S. Pat. No. 4,445,730 a housing supporting a hydraulically-driven pivoting rocker arm and plunger is interposed between the subject turbine disc row and an adjoining opposed row. The housing is clamped over the subject rotor disc outer circumferential and axial faces. The hydraulic cylinder pushes down on a drive end of the pivoting rocker arm. A driven end of the rocker arm pushes the plunger into contact with an abutting axial face of the blade root, driving the stuck root out of the rotor slot. Both powered blade removal tools are relatively heavy and cumbersome for service technicians to position on the rotor. Both powered tools are more costly to construct and operate than manually operated stuck blade removal tools.

SUMMARY OF THE INVENTION

Accordingly, a suggested object of embodiments of the invention is to create a turbine engine blade removal method and apparatus that aligns and support a manually driven tool relative to a blade root axial face, so that driving force applied by a manually controlled driving device, such as an sledge hammer or a pneumatic hammer, is directed to the blade root, reducing risk of inadvertent damage to the blade, blade root or corresponding rotor disc slot.

Another suggested object of embodiments of the invention is to create a turbine engine blade removal method and apparatus that positions the apparatus between a subject turbine rotor disc and an abutting adjoining disc without the need to apply clamps to the subject rotor disc, facilitating quick apparatus installation and use.

An additional suggested object of embodiments of the invention is to create a turbine engine blade removal apparatus that is inexpensive to manufacture and employs a method of operation that is easy to use in factory service facilities or at turbine engine field locations.

These and other objects are achieved in one or more embodiments of the invention by a blade removal apparatus with a pair of opposed outwardly biased blocks that are positioned proximal a turbine blade root and corresponding rotor disc slot, between opposed axial faces of the subject first rotor disc and an adjoining second rotor disc. The apparatus has a guide bushing coupled to at least one of the blocks, with a guide bushing aperture. The blocks are outwardly biased in abutting contact with first and second rotor disc axial faces, aligning a guide bushing aperture with an exposed axial face of the blade turbine root. A punch is inserted in the guide bushing aperture so that a punch tip is in abutting relationship with the turbine root axial face. An impact tool drives an opposite impact end of the punch, causing the punch to direct a relative driving force on the blade root, separating the blade root from the corresponding rotor disc slot.

Embodiments of the invention feature an apparatus for removing a turbine engine blade root from a corresponding turbine engine rotor disc slot of a rotor having at least a pair of first and second rotor discs having respective first and second opposed axial faces. The apparatus or tool has a pair of opposed outwardly biased first and second blocks for biased abutment against corresponding first and second axial faces of respective first and second rotor discs. A guide bushing is coupled to at least the first block, defining a guide bushing aperture that is capable of alignment with an exposed axial face of a blade turbine root that is engaged within a first rotor disc slot. The guide bushing receives a punch in its aperture and aligns the punch with the blade turbine root axial face, so that punch impacts dislodge or remove the turbine blade root from its corresponding rotor slot.

Other embodiments of the invention feature a method for removing a turbine or compressor blade root from a corresponding turbine engine rotor disc slot of a rotor having at least a pair of first and second rotor discs having respective first and second opposed axial faces. A turbine engine blade removal apparatus or tool is provided, having pair of opposed outwardly biased first and second blocks and a guide bushing coupled to at least the first block, defining a guide bushing aperture. The apparatus is inserted between first and second rotor discs so that the guide bushing aperture is aligned with an exposed axial face of a blade turbine root that is engaged within the first rotor disc. The first and second blocks are outwardly biased into abutment against corresponding first and second axial faces of the respective first and second rotor discs. A punch having a tip is inserted into the bushing aperture, so that the tip is in abutting contact with the blade root exposed axial face. The punch also has an impact end opposite the tip. The punch impact end is driven with an impact tool in order to remove the turbine blade root from its corresponding rotor slot in the first rotor disc. The impact tool may comprise a manually powered hammer or a pneumatic hammer.

Additional embodiments of the invention feature a method for removing a turbine engine turbine or compressor blade root from a corresponding turbine engine rotor disc slot of a rotor having at least a pair of first and second rotor discs. Each of those respective discs has a corresponding first or second opposed axial face. The method comprises providing a blade removal apparatus having a pair of opposed outwardly biased first and second blocks, at least one of the blocks having a lower face profile that conforms to outer circumferential profile of a corresponding rotor disc. The apparatus has a protector block that is coupled to at least one of the blocks, interposed between its corresponding block and its corresponding rotor disc. At least one helical spring is captively retained between the first and second blocks by an elongated screw that is slidably engaged with one of the blocks, for outwardly biasing the respective first and second blocks. The apparatus also has a locking mechanism that is coupled to at least one of the first or second blocks, for outwardly biased coupling and locking of the first and second blocks relative to each other. A guide bushing is coupled to at least the first block, defining a guide bushing aperture. The apparatus is used by inserting it between first and second rotor discs, so that the guide bushing aperture is aligned with an exposed axial face of a blade root that is engaged within a first rotor disc. The first and second blocks are outwardly biased the into abutment against corresponding first and second axial faces of the respective first and second rotor discs with biasing force generated by the at least one helical spring. Thereafter the first and second blocks are locked relative to each other and their respective biased contact with their corresponding first and second rotor disc. A punch having a tip is inserted into the bushing aperture, so that the tip is in abutting contact with the blade root exposed axial face, the punch also having an impact end opposite the tip. The punch impact end is struck with an impact tool in order to remove the blade root from its corresponding rotor slot in the first rotor disc.

The respective objects and features of the invention embodiments may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which:

FIG. 3 is an elevational view of a turbine engine blade root and mating rotor disc slot, showing an impact circle for the blade removal apparatus of FIGS. 1 and 2, taken along 3-3 of FIG. 2;

FIG. 4 is a detailed perspective view of the blade removal apparatus of FIG. 1.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in a turbine engine blade removal apparatus that has a pair of opposed outwardly biased blocks, which are positioned proximal a turbine or compressor blade root and corresponding rotor disc slot between opposed axial faces of the subject first rotor disc and an adjoining second rotor disc. The apparatus has a guide bushing and a guide bushing aperture that is coupled to at least one of the blocks. The blocks are outwardly biased in abutting contact with first and second rotor disc axial faces, aligning a guide bushing aperture with an exposed axial face of the blade turbine root. In some embodiments of the invention the blocks are locked into the aligned position with a locking mechanism, such as at least one jack screw. A punch is inserted in the guide bushing aperture so that a punch tip is in abutting relationship with the turbine engine blade root axial face. An impact tool drives an opposite impact end of the punch, causing the punch to direct a relative driving force on the blade root, separating the blade root from the corresponding rotor disc slot.

Figure 1:
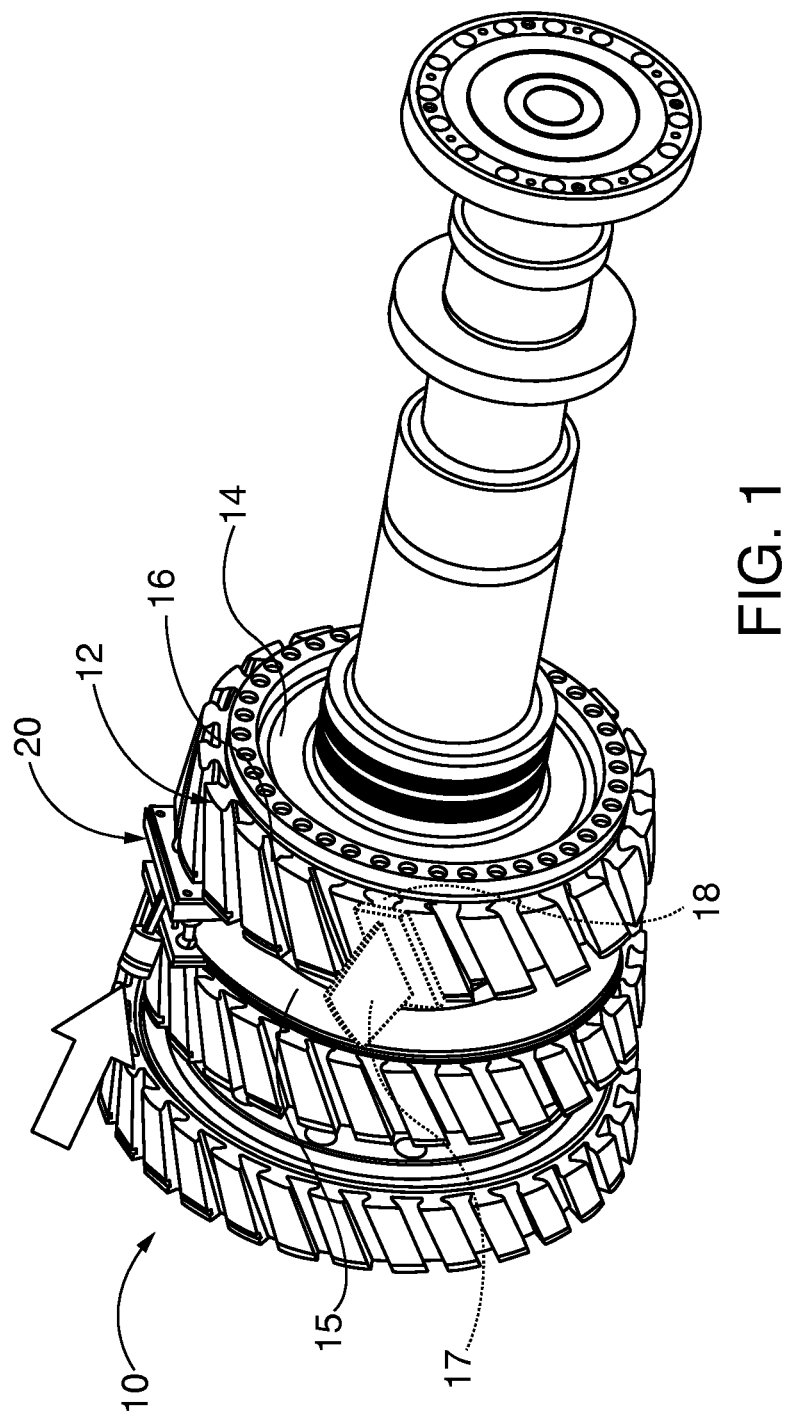
FIG. 1 is a perspective view of a turbine engine blade removal apparatus in accordance with an embodiment of the invention that is coupled to a rotor between a pair of rotor discs.
Figure 2:
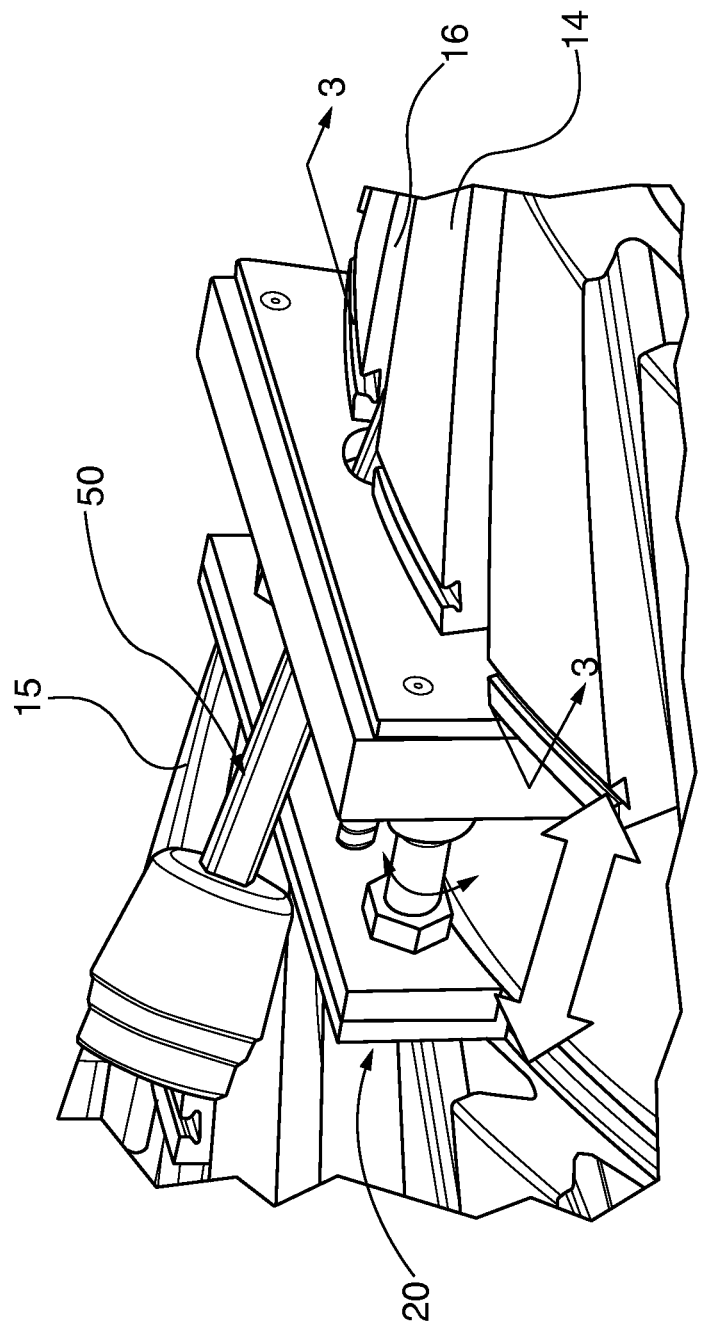
FIG. 2 is a detailed perspective view of the turbine engine blade removal apparatus of FIG. 1.

FIGS. 1-3 show a known, conventional combustion turbine engine compressor section rotor 10 having a first rotor disc 14 that is aligned in opposed spaced relationship with a second rotor disc 15. The respective rotor discs 14 and 15 have opposed axial faces. The rotor discs have circumferential, generally dovetailed profile rotor slots 16 that slidably receive a corresponding blade root 18 of a turbine engine blade 17 (hereafter generally referred to as a "turbine blade"). The turbine blade root 18 has an axial face 19. The turbine blade 17 is restrained axially within its corresponding rotor slot 16 by locking pin 19A of known design. Only one turbine blade 17 is shown in FIGS. 1 and 2, it being understood that other turbine blades are retained within the remaining rotor slots 16 of all rotor discs. Blade removal tool or apparatus 20 is retained or captured axially and circumferentially between the axial faces of the first and second rotor discs 14 and 15 so that punch 50 is aligned with the impact zone 19 B defined on the turbine blade root axial face 19.

Figure 5:
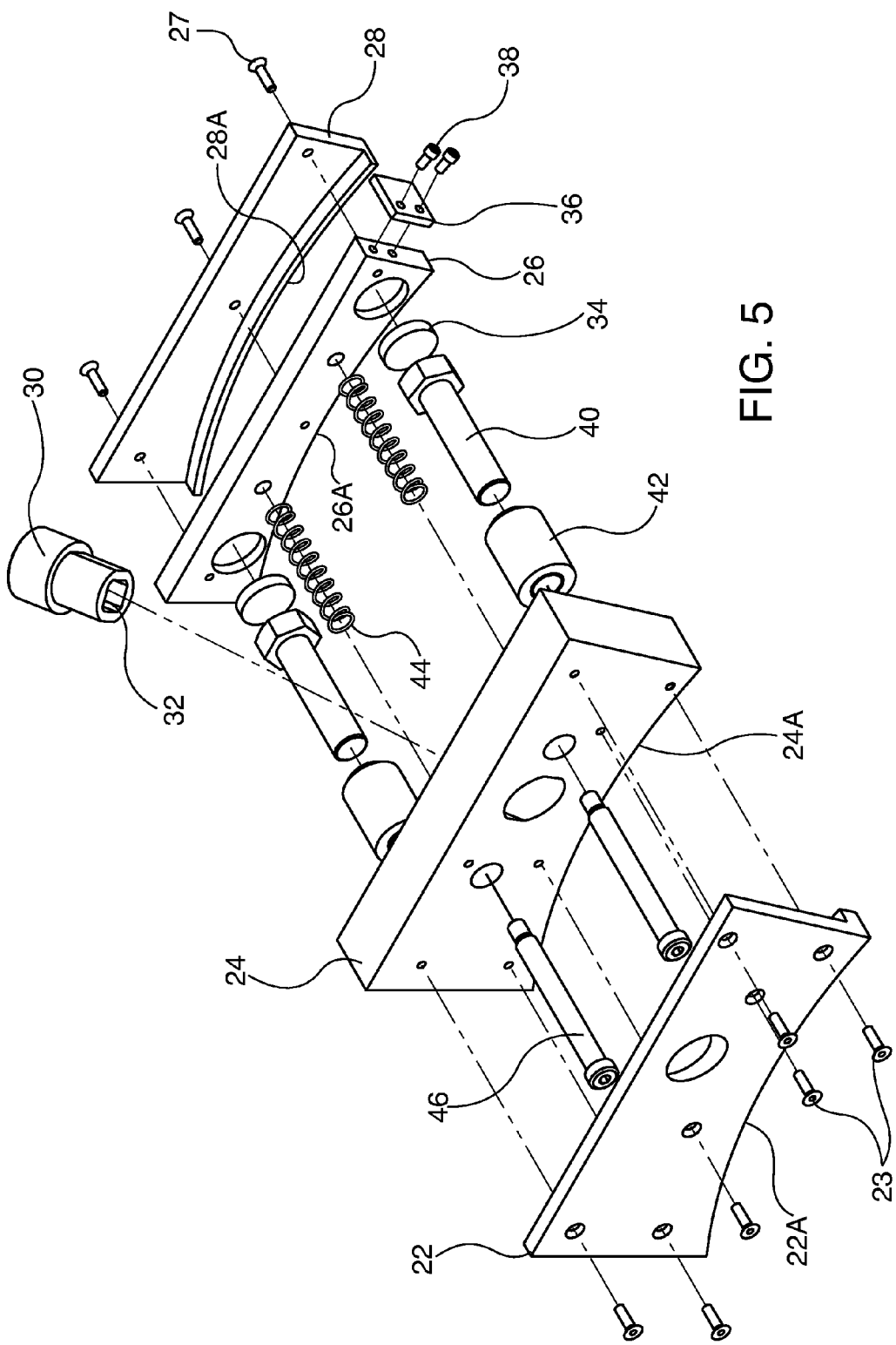
FIG. 5 is an exploded view of the blade removal apparatus of FIG. 1.

The apparatus 20 is shown in greater detail in FIGS. 4 and 5. A first disc protector 22 abuts against an axial face of the first rotor disc 14. The opposite face of the disc protector 22 abuts against a first generally planar block 24, to which it is coupled with screws 23. The disc protector 22 is constructed of a resilient material, such as plastic that reduces likelihood of damage to the first turbine disc 14 as the tool 20 is inserted and operated to remove a stuck blade root 18. The disc protector 22 and the block 24 have respective lower arcuate-shaped profile lower faces 22A and 24A that conform to the first rotor disc 14 outer circumferential profile. A second block 26 is in opposed relationship with the second rotor disc 15, with a resilient material second disc protector 28 interposed between the second block and the axial face of the corresponding second rotor disc 15. The second disc protector 26 is coupled to the second block 26 by screws 27. As with the first block 24 and disc protector 22, the second disc protector 28 and its corresponding second block 26 have arcuate-shaped lower faces 28A and 26A that conform to the second rotor disc 15 circumferential profile.

Guide bushing 30 is coupled to the first block 24 and defines a bushing central through-aperture 32 for slidable receipt of a punch 50. When the blade removal apparatus 20 is positioned between the rotor discs 14 and 15, the bushing central aperture is aligned with the impact spot 19B of a corresponding blade root axial face 19. The blade removal apparatus 20 guide bushing 30 aligns and supports the punch 50 with the blade root impact spot 19B; so that the punch does not inadvertently strike or damage the rotor slot 16 or the corresponding blade root 18 outer margins that are in sliding contact with the rotor slot.

The blade removal apparatus 20 is retained in alignment with the desired rotor slot 16 and blade root 18 interface by outwardly biasing the first block 24 and second block 26 blocks axially into contact with corresponding first 14 and second 15 rotor disc opposed axial faces and then securing relative alignment with a locking mechanism that is coupled to the first and second blocks. Alignment block 36 is coupled to the second block 26 by screws 38. The alignment block 36 projects axially toward the second rotor disc 15 and engages the rotor disc periphery, to align the blade removal apparatus circumferentially and tangentially relative to the corresponding rotor disc. Additional alignment blocks optionally may be added to either of the first or second blocks 24, 26. As shown in FIG. 5, the locking mechanism function is provided by a pair of jackscrew assemblies each comprising a jackscrew pad 34 retained within the relatively softer metal second block 26; a jackscrew 40 and a female threaded jackscrew insert 42. Threadably separating the jackscrew 40 and its mating jackscrew insert 42 outwardly biases the first and second blocks 24, 26 into locked firm contact with the corresponding axial faces of the first and second rotor discs 14 and 15. The initial first and second block 24 and 26 outwardly biased engagement with the opposed rotor discs function is performed with helical springs 44 that are captured on shoulder bolts 46. The shoulder bolts are slidably engaged and restrained within the first block 20 while threaded distal ends of the shoulder bolts threadably engage the second block 26.

Referring to FIG. 4, the punch 50 has a striking tip 52 that is profiled for striking the impact zone 19B of the blade root 18. The punch 50 outer circumference and that of the corresponding drive bushing aperture 32 have corresponding conforming anti-rotation profiles. In this manner the punch 50 can reciprocate within the guide bushing 32 during impact cycles, but tip the punch tip 52 remains oriented in flat abutting engagement with the turbine blade root impact zone 19B. The punch 50 has a punch impact end 54 that struck by an impact tool. In this way the punch transfers impact force from the impact tool to the impact zone 19B of the blade root 18, shearing any lock pin 19A that is retaining the blade 17 axial position in the rotor slot 16. Suitable impact tools include a pneumatic hammer 54 or a manually powered sledge hammer or other hammer (not shown).

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. For example, the turbine engine blade removal apparatus and its methods for use are adaptable for combustion turbine engine compressor or turbine blade removal, as well as steam turbine engine turbine blade removal. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. Apparatus for removing a turbine engine blade root from a corresponding turbine engine rotor disc slot of a rotor having at least a pair of first and second rotor discs having respective first and second opposed axial faces, comprising:
   a pair of opposed outwardly biased first and second blocks for insertion between and biased abutment against the corresponding first and second opposed axial faces of the respective first and second rotor discs;
   a guide bushing coupled to at least the first block, defining a guide bushing aperture that is capable of alignment with an exposed axial face of a blade root that is engaged within a first rotor disc slot, for receipt of a punch therein, the aperture defining a skewed central axis that is oriented downwardly toward a bottom edge of the first block and inwardly towards one of two lateral side edges thereof;
   a punch inserted into the guide bushing aperture, having a tip for striking the blade root axial face, and an impact end opposite the tip, for striking contact by a percussive impact tool, the impact end oriented above the first and second blocks; and
   at least one helical spring captively retained by, and spanning between, the first and second blocks by an elongated screw that is slidably engaged with one of the blocks, for outwardly biasing the respective first and second blocks against the corresponding first and second rotor slots.

2. The apparatus of claim 1, further comprising at least one of the blocks having a lower face profile that conforms to outer circumferential profile of its corresponding first or second rotor disc, for conforming abutment of the block therewith when the apparatus is coupled to a corresponding rotor.

3. The apparatus of claim 1, further comprising a protector block coupled to at least one of the first or second blocks, for interposition between its corresponding first or second block and its corresponding first or second rotor disc.

4. The apparatus of claim 1, further comprising a threaded jack screw locking mechanism having opposite ends in abutting contact with, and spanning between, the corresponding first or second blocks against the corresponding first and second rotor slots.

5. The apparatus of claim 1, further comprising a circumferential alignment block coupled to at least one of the first or second blocks, for abutting engagement with a corresponding one of the first or second rotor discs.

6. The apparatus of claim 1, further comprising the punch having a tip profile that conforms with its corresponding axial face of the blade root, for abutting engagement therewith, and an anti-rotation circumferential profile for sliding passage and engagement with a corresponding profile formed in the alignment bushing aperture.

* * * * *